UNITED STATES PATENT OFFICE.

HUGH F. WATTS AND ALONZO COAN, OF BOULDER, COLORADO.

PROCESS OF REDUCING ZINC SLIMES.

SPECIFICATION forming part of Letters Patent No. 541,447, dated June 18, 1895.

Application filed October 22, 1894. Serial No. 526,647. (No specimens.)

*To all whom it may concern:*

Be it known that we, HUGH F. WATTS and ALONZO COAN, citizens of the United States, residing at Boulder, in the county of Boulder and State of Colorado, have invented a certain new and useful Process of Reducing Zinc Slimes; and we do hereby declare the following to be a full, clear, and exact description of the invention, such as will enable others skilled in the art to which it appertains to make and use the same.

Our invention relates to a new and improved process of treating zinc slimes, the object of the same being to remove from such slimes all the zinc and other foreign matter contained therein, whereby we obtain a bullion of a homogeneous and uniform character. In the well-known MacArthur-Forrest process of leaching ores of gold and silver with a solution of cyanide of potassium, the precious metals are precipitated by the use of metallic zinc, usually in the form of thread-like fibers or shavings. The product thus formed is known as zinc slimes, the same containing gold, silver, a large percentage of metallic zinc and a certain quantity of insoluble salts of zinc, the greater portion being cyanide of zinc. Said slimes may also contain the impurities of commercial zinc, as well as other foreign matters. The usual method of treating these slimes is to introduce them into a large lead-lined tank, the metallic zinc being dissolved by treating with dilute sulphuric acid, say one part of acid to ten of water. The metallic zinc is dissolved by the treatment, but the cyanide of zinc is totally unaffected. If the residue remaining after this treatment were dried and melted, it would contain all the undissolved zinc and the operation would be difficult and uncertain. Furthermore, the bullion obtained would be of a lower grade and full of impurities.

Our process consists in first treating the slimes with dilute sulphuric acid, which dissolves the metallic zinc, washing the residue for the purpose of drawing off the soluble salts remaining therein, as well as removing the acid and afterward treating the residue with concentrated sulphuric acid and boiling. This removes all the zinc salts, including the cyanides, converting them into zinc sulphate, and if there is any silver in the slimes, it will dissolve this also, converting the same into the sulphate and leaving the gold in its pure state. The gold may be melted up and the bullion obtained thereby is of a homogeneous character. The silver may be removed from solution by any of the well-known ways, as by running the solution in contact with copper plates or by chloridizing.

In carrying out our process, we proceed as follows: Starting with the zinc slimes, we place the same in a tank lined with lead, add dilute sulphuric acid which dissolves the metallic zinc, draw off the solution and wash the residue to free the same from the soluble salts remaining therein and to remove the acid. This residue is dried and introduced into a cast-iron or other suitable vessel and boiled with concentrated sulphuric acid. The cyanide of zinc is thereby converted into the sulphate soluble in water. If the slimes should contain silver the whole or a portion of it is transformed into the sulphate and may be recovered in the manner stated heretofore.

It is necessary that the treatment with dilute acid precede that with the concentrated acid, for the reason that the concentrated acid will not dissolve the metallic zinc, which it is important to remove prior to the remaining insoluble salts in order to reduce the bulk of the material treated and thereby the cost of the concentrated acid. The residue remaining after the treatment with concentrated sulphuric acid is washed, melted and cast into bars for use. It is of a uniform or homogeneous nature and is superior in all ways to the bullion obtained by other methods.

Having thus described our invention, what we claim as new, and desire to secure by Letters Patent, is—

The herein described process of treating zinc slimes containing the precious metals, which consists in first treating the same with dilute sulphuric acid for the purpose of removing metallic zinc, washing the residue to remove the soluble salts and the remaining acid, and boiling the residue thus formed with concentrated sulphuric acid to dissolve the cyanide of zinc and the other salts thereof which are insoluble in the dilute acid, substantially as and for the purposes described.

In testimony whereof we have signed this specification in the presence of two subscribing witnesses.

HUGH F. WATTS.
     ALONZO COAN.

Witnesses:
 C. G. BUCKINGHAM,
 W. S. BELLMAN.